(12) United States Patent
Nakamura et al.

(10) Patent No.: US 11,524,509 B2
(45) Date of Patent: Dec. 13, 2022

(54) INK, RECORDING DEVICE, RECORDING METHOD, AND RECORDED MATTER

(71) Applicant: RICOH COMPANY, LTD., Tokyo (JP)

(72) Inventors: Yuta Nakamura, Kanagawa (JP); Naoto Shimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 900 days.

(21) Appl. No.: 16/292,491

(22) Filed: Mar. 5, 2019

(65) Prior Publication Data

US 2019/0270900 A1 Sep. 5, 2019

(30) Foreign Application Priority Data

Mar. 5, 2018 (JP) .............. JP2018-038378
Oct. 25, 2018 (JP) .............. JP2018-200793
Jan. 30, 2019 (JP) .............. JP2019-013766

(51) Int. Cl.
| | | |
|---|---|---|
| *C09D 11/00* | (2014.01) | |
| *B41J 11/00* | (2006.01) | |
| *C09D 11/36* | (2014.01) | |
| *C09D 11/322* | (2014.01) | |
| *C09D 11/38* | (2014.01) | |
| *C09D 1/00* | (2006.01) | |
| *C09D 4/00* | (2006.01) | |
| *C09D 5/00* | (2006.01) | |
| *C09K 3/14* | (2006.01) | |

(52) U.S. Cl.
CPC ....... *B41J 11/00216* (2021.01); *C09D 11/322* (2013.01); *C09D 11/36* (2013.01); *C09D 11/38* (2013.01)

(58) Field of Classification Search
USPC .................. 106/31.01, 31.13, 31.6
See application file for complete search history.

(56) References Cited

U.S. PATENT DOCUMENTS

| 2011/0195235 A1* | 8/2011 | Kato ................. C09D 5/32 252/587 |
|---|---|---|
| 2017/0174919 A1 | 6/2017 | Kido et al. |
| 2017/0335123 A1 | 11/2017 | Nakamura et al. |
| 2018/0001669 A1 | 1/2018 | Furukawa et al. |
| 2018/0012761 A1 | 5/2018 | Masahiro et al. |
| 2018/0208783 A1 | 7/2018 | Takahashi et al. |

FOREIGN PATENT DOCUMENTS

| JP | 2001-294785 | 10/2001 |
|---|---|---|
| JP | 2008-255323 | 10/2008 |
| JP | 2009-114298 | 5/2009 |
| JP | 2013-189596 | 9/2013 |
| JP | 2017-025311 | 2/2017 |

* cited by examiner

*Primary Examiner* — James E McDonough
(74) *Attorney, Agent, or Firm* — Grüneberg and Myers, PLLC

(57) ABSTRACT ink includes water, an alcohol having a boiling point of 240 degrees C. or lower, and an infrared absorbent, wherein the alcohol accounts for 5.0 percent by mass or more of the total amount of the ink and the ink is free of an alcohol having a boiling point higher than 240 degrees C.

10 Claims, 2 Drawing Sheets

INK, RECORDING DEVICE, RECORDING METHOD, AND RECORDED MATTER

CROSS-REFERENCE TO RELATED APPLICATIONS

This patent application is based on and claims priority pursuant to 35 U.S.C. § 119(a) to Japanese Patent Application Nos. 2018-038378, 2018-200793, and 2019-013766 filed on Mar. 5, 2018, Oct. 25, 2018, and Jan. 30, 2019, respectively, in the Japan Patent Office, the entire disclosures of which are incorporated by reference herein.

BACKGROUND

Technical Field

The present disclosure relates to an ink, a recording device, and a recording method, and recorded matter.

Description of the Related Art

Heated-wind blowing to ink on a recording medium is known as a method of drying ink ink-jetted onto a recording medium. Alternatively, infrared irradiation to ink on a recording medium is also known as another method of drying ink. This infrared irradiation is appealing since it is superior to the heated-wind blowing in terms of drying property of ink and shortening the time to dry the ink.

SUMMARY

According to embodiments of the present disclosure, an improved ink is provided which includes water, an alcohol having a boiling point of 240 degrees C. or lower, and an infrared absorbent, wherein the alcohol accounts for 5.0 percent by mass or more of the total amount of the ink and the ink is free of an alcohol having a boiling point higher than 240 degrees C.

As another aspect of embodiments of the present disclosure, provided is an improved recorded matter which includes a non-permeable substrate and an ink film formed on the non-permeable substrate, wherein the non-permeable substrate has a water absorption of 10 mL/m$^2$ or less within 30 msec$^{1/2}$ of a contact with water as measured by Bristow method, and the ink film contains an alcohol having a boiling point of 240 degrees C. or lower and an infrared absorbent but is free of an alcohol having a boiling point higher than 240 degrees C.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
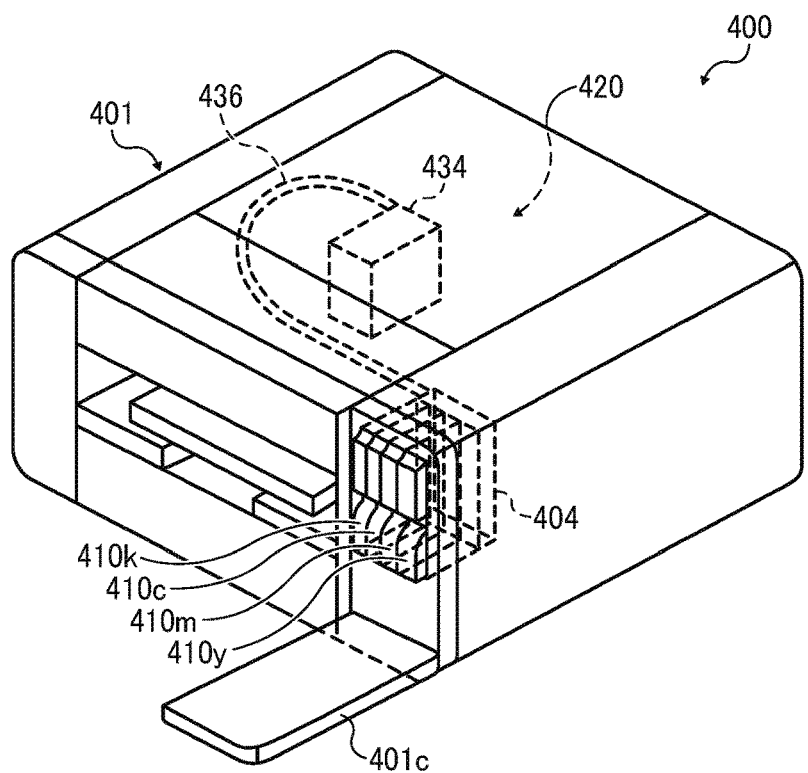
FIG. 1 is a diagram illustrating a perspective view of an example of a recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

A method of drying aqueous ink has been proposed which includes discharging aqueous ink containing additives such as a colorant, an infrared absorbent, water, and a water-soluble organic solvent and irradiating the ink discharged area with infrared to cause the infrared absorbent to partially absorb the infrared and generate heat, by which the ink is dried.

However, when the ink containing an infrared absorbent is discharged to a recording medium by an inkjet method and dried with infrared irradiation to the recording medium, the infrared absorbent precipitates in the ink, thereby degrading discharging stability of the ink while imparting excellent drying property to the ink.

The ink according to embodiments of the present disclosure has excellent drying property when discharged onto a recording medium and excellent discharging stability.

Next, aspects of the present disclosure are described.

Ink

The ink of the present embodiment of the present disclosure contains water, an organic solvent such as an alcohol having a boiling point of 240 degrees C. or lower, and an infrared absorbent. The ink also contains other optional additives such as a coloring material, a resin, and a surfactant. The ink of the present embodiment can be used as an inkjet ink.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

Organic Solvent

The organic solvent contained in the ink of the present embodiment contains an alcohol having a boiling point of 240 degrees C. or lower. The alcohol having a boiling point of 240 degrees C. or lower serves as a humectant in the ink before the ink is discharged, thereby enhancing discharging stability of the ink and improves drying property of the ink after the ink is discharged to a recording medium. In addition, the alcohol has excellent compatibility with the infrared absorbent contained in the ink of the present embodiment. This can reduce precipitation of the infrared absorbent in the ink and improve discharging stability of the ink.

Liquid alcohol at 25 degrees C. under 1 atmosphere pressure can be the alcohol having a boiling point of 240 degrees C. or lower. The alcohol having a boiling point of 240 degrees C. or lower includes a polyhydric alcohol.

Specific examples of the alcohols having a boiling point of 240 degrees C. or lower include, but are not limited to, ethylene glycol (boiling point of 197 degrees C.), 1,2-propanediol (boiling point of 187 degrees C.), 1,3-propanediol (boiling point of 213 degrees C.), 1,2-butanediol (boiling point of 192 degrees C.), 1,3-butanediol (boiling point of 207 degrees C.), 1,4-butanediol (boiling point of 230 degrees C.), 2,3-butanediol (boiling point of 180 degrees C.), 3-methyl-1,3-butanediol (boiling point of 204 degrees C.), 1,2-pentanediol (boiling point of 206 degrees C.), 2,4-pentanediol (boiling point of 202 degrees C.), 1,2-hexanediol (boiling point of 224 degrees C.), 2,5-hexanediol (boiling point of 218 degrees C.), 2,2,4-trimethyl-1,3-pentanediol (boiling point of 232 degrees C.), and 3-methoxy-3-methylbutanol (boiling point of 174 degrees C.). Other specific examples include, but are not limited to, glycol ethers such as dipropylene glycol monomethyl ether (boiling point of 190 degrees C.).

Of these, preferred are 3-methoxy-3-methylbutanol (boiling point of 174 degrees C.), 1,2-propanediol (boiling point of 187 degrees C.), 1,3-butanediol (boiling point of 207 degrees C.), and 1,2-hexanediol (boiling point of 224 degrees C.

Moreover, as the alcohol having a boiling point of 240 degrees C. or lower, it is preferable to use an alcohol having a boiling point of 180 degrees C. or lower. It is more preferable to use an alcohol having a boiling point higher than 180 degrees C. and an alcohol having a boiling point of 180 degrees C. or lower in combination. The alcohol having a boiling point of 180 degrees C. or lower has more excellent compatibility with the infrared absorbent contained in the ink of the present embodiment.

Specific examples of the alcohol having a boiling point of 180 degrees C. or lower include, but are not limited to, 3-methoxy-3-methylbutanol (boiling point of 174 degrees C.) and 2,3-butane diol (boiling point of 180 degrees C.). Of these, 3-methoxy-3-methylbutanol (boiling point of 174 degrees C.) is preferable.

The proportion of the alcohol having a boiling point of 240 degrees C. or lower to the total amount of the ink is 5.0 percent by mass or greater, preferably 10.0 percent by mass or greater, and more preferably 15.0 percent by mass or greater. The proportion of the alcohol having a boiling point of 240 degrees C. or lower to the total amount of the ink is preferably 40.0 percent by mass or less, more preferably 25.0 percent by mass or less, and furthermore preferably 20.0 percent by mass or less. When the proportion of the alcohol having a boiling point of 240 degrees C. or lower is 5.0 percent by mass or lower, drying property of the ink discharged to a recording medium is insufficient, which leads to production of images with defects such as beading.

The proportion of the alcohol having a boiling point of 180 degrees C. or lower to the total amount of the ink is preferably 2.0 percent by mass or greater and more preferably 5.0 percent by mass or greater. The proportion of the alcohol having a boiling point of 180 degrees C. or lower to the total amount of the ink is preferably 25.0 percent by mass or less, more preferably 20.0 percent by mass or less, and furthermore preferably 15.0 percent by mass or greater. When the proportion of the alcohol having a boiling point of 180 degrees C. or lower is within this range, drying property of the ink after it is discharged to a recording medium is secured, thereby reducing occurrence of defects such as beading to images.

The organic solvent contained in the ink of the present embodiment is free of (does not contain) an alcohol having a boiling point higher than 240 degrees C. This is because the alcohol whose boiling point is higher than 240 degrees C. degrades drying property of the ink after it is discharged to a recording medium. In the present disclosure, that the ink is free of an alcohol having a boiling point higher than 240 degrees C. means the ink does not substantially contain an alcohol having a boiling point higher than 240 degrees C. and the proportion of the alcohol having a boiling point higher than 240 degrees in the ink is less than 1.0 percent by mass. The proportion of the alcohol having a boiling point higher than 240 degrees C. to the total amount of the ink is preferably 0.5 percent by mass or less, more preferably 0.1 percent by mass or less, and furthermore preferably 0.0 percent by mass (that is, totally free of the alcohol having a boiling point higher than 240 degrees C.).

Specific examples of the alcohol having a boiling point higher than 240 degrees C. include, but are not limited to, diethylene glycol (boiling point of 244 degrees C.), triethylene glycol (boiling point of 287 degrees C.), polyethylene glycol, polypropylene glycol, 1,5-pentanediol (boiling point of 242 degrees C.), 1,6-hexanediol (boiling point of 250 degrees C.), glycerin (boiling point of 290 degrees C.), and 2-ethyl-1,3-hexanediol (boiling point of 243 degrees C.). The ink of the present embodiment does not substantially contain these alcohols.

The organic solvent contained in the ink of the present embodiment may optionally furthermore contain other organic solvents to suit to a particular application.

Specific examples of such organic solvents include, but are not limited to, nitrogen-containing heterocyclic compounds such as 2-pyrrolidone, N-methyl-2-pyrrolidone, 1,3-dimethyl-2-imidazolidinone, ε-caprolactam, and γ-butyrolactone, amides such as formamide, N-methylformamide, N, N-dimethylformamide, 3-methoxy-N, N-dimethylpropionamide, and 3-butoxy-N, N-dimethylpropionamide, amines such as triethylamine, sulfur-containing compounds such as dimethylsulfoxide and sulfolane, propylene carbonate, and ethylene carbonate.

As the other organic solvents, in terms of enhancing the drying property, it is preferable to use an organic solvent having a boiling point of 240 degrees C. or lower. For example, 3-methoxy-N, N-dimethylpropionamide (boiling point of 213 degrees C.) can be suitably used.

The proportion of the organic solvent including the alcohol having a boiling point of 240 degrees C. or lower in the ink has no particular limit and can be suitably selected to suit to a particular application.

In terms of drying property and discharging reliability of ink, the proportion is preferably from 10 to 60 percent by mass and more preferably from 20 to 60 percent by mass.

Coloring Material

The coloring material has no particular limit. For example, pigments and dyes are usable.

As the pigment, inorganic pigments or organic pigments can be used. These can be used alone or in combination. In addition, it is possible to use a mixed crystal as the pigment.

As the pigments, for example, black pigments, yellow pigments, magenta pigments, cyan pigments, white pigments, green pigments, orange pigments, and gloss pigments and metallic pigments of gold, silver, etc., can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination. Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. 1. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to percent by mass and more preferably from 1 to 10 percent by mass in terms of enhancement of image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Resin

The type of the resin contained in the ink has no particular limit and can be suitably selected to suit to a particular application. Examples are polyurethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins. Of these, polyurethane resins are preferable. Polyurethane resins are easily plasticized in combinational use with alcohol, which improves fixability and abrasion resistance of formed images.

Resin particles made of such resins can be also used. It is possible to mix a resin emulsion in which such resin particles are dispersed in water as a dispersion medium with materials such as a coloring material and an organic solvent to obtain an ink. It is possible to use suitably-synthesized resin particles. Alternatively, the resin particle is available on the market. These resin particles can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total amount of the ink.

In particular, inclusion of a polyurethane resin is preferable because it enhances abrasion resistance and reduces occurrence of beading. Moreover, when the proportion of the polyurethane resin in the ink is 5.0 percent or more, preferably from 5.0 to 20.0 percent by mass, occurrence of beading is further reduced.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Infrared Absorbent

The infrared absorbent is, for example, an infrared absorbing pigment or dye. The infrared absorbent preferably has a maximum absorbing wavelength of from 700 to 1,000 nm. Also, the infrared absorbent has a strong light absorbing power based on charge transfer of organic dyes or pigments and metal complexes. The infrared absorbent has a ratio of the absorption coefficient at the maximum absorption wavelength in a range of from 380 to 700 nm to the absorption coefficient at the maximum absorption wavelength in a range of from 700 to 1000 nm of preferably 0.5 or less and more preferably 0.4 or less.

Examples of the infrared absorbent are cyanine dyes having an extended polymethine skeleton, phthalocyanine dyes having aluminum or zinc at the center, various naphthalocyanine compounds, nickel dithiolene complexes having a planar tetracoordinate structure, squalium dyes, quinone-based compounds, diimmonium compounds, and azo compounds. Any suitably synthesized surfactant and any product available on the market is usable.

Specific examples of commercially available products include, but are not limited to, NIR746A, NIR782E, NIR818D, NIR869D, NIR880D, NIR911A, NIR980A, NIR1054WD, and NIR1054B (manufactured by QCR Solutions Corp), LUWSIR4, LUNIR5, LUNIR8/1, and LUNIR6 (manufactured by Luminochem Ltd.), and ADS775MI, ADS775MP, ADS775PI, ADS775PP, ADS780HO, ADS798SM, ADS800AT, ADS815EI, ADS830AT, ADS1065A, ADS1075A, ADS780WS, and ADS845MC (manufactured by American Dye Source, Inc.).

The proportion of the organic solvent in the ink has no particular limit and can be suitably selected to suit to a particular application.

In terms of drying property and discharging reliability of ink, the proportion is preferably from 0.1 to 10.0 percent by mass, more preferably from 0.5 to 5.0 percent by mass, and furthermore preferably from 0.8 to 1.5 percent by mass.

The mass ratio of the alcohol having a boiling point of 240 degrees C. or lower to the infrared absorbent in the ink is preferably from 5.0 to 30.0, more preferably from 10.0 to 30.0, furthermore preferably from 10.0 to 21.0, and particularly preferably from 15.0 to 20.0. Within this range, precipitation of the infrared absorbent in the ink can be reduced and discharging stability of the ink can be enhanced.

The mass ratio of the alcohol having a boiling point of 180 degrees C. or lower to the infrared absorbent in the ink is preferably from 2.0 to 20.0 and more preferably from 5.0 to 15.0. Within this range, precipitation of the infrared absorbent in the ink can be reduced and discharging stability of the ink can be further enhanced.

Additive

Ink may further optionally include a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, silicone-based surfactants not decomposed even in high pH environment are preferable. The silicone-based surfactants include, for example, side chain-modified polydimethyl siloxane, both distal end-modified polydimethyl siloxane, one distal end-modified polydimethyl siloxane, and side chain both distal end-modified polydimethyl siloxane. As the modification group, it is particularly preferable to select a polyoxyethylene group or polyoxyethylene polyoxypropylene group because these demonstrate good properties as aqueous surfactants. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactants do not easily produce foams. Specific examples of the perfluoroalkyl sulfonic acid compounds include, but are not limited to, a perfluoroalkyl sulfonic acid and a salt of perfluoroalkyl sulfonic acid.

Specific examples of the perfluoroalkyl carboxylic acid compounds include, but are not limited to, a perfluoroalkyl carboxylic acid and a salt of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

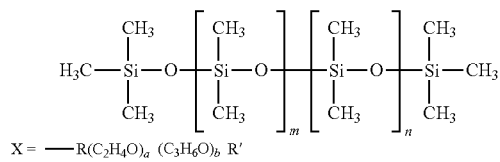

Chemical formula S-1

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

The fluorochemical surfactant is preferably a compound having 2 to 16 fluorine-substituted carbon atoms and more preferably a compound having 4 to 16 fluorine-substituted carbon atoms.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds not easily foam and the fluorosurfactant represented by the following Chemical formula F-1 or Chemical formula F-2 is more preferable.

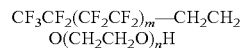

Chemical formula F-1

In the compound represented by Chemical formula F-1, m is preferably 0 or an integer of from 1 to 10 and n is preferably 0 or an integer of from 1 to 40.

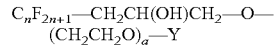

Chemical formula F-2

In the compound represented by the chemical formula F-2, Y represents H or $C_mF_{2m+1}$, where m represents an integer of from 1 to 6, or $CH_2CH(OH)CH_2-C_mF_{2m+1}$, where m represents an integer of from 4 to 6, or $C_pH_{2p+1}$, where p is an integer of from 1 to 19. "n" represents an integer of from 1 to 6. "a" represents an integer of from 4 to 14.

As the fluorochemical surfactant, products available on the market may be used.

Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not to be lower than 7. Specific examples include, but are not limited to, amines such as diethanol amine and triethanol amine.

Property of Ink

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
rotational frequency: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal material in contact with liquid.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water absorption amount of 10 mL/m$^2$ or less within 30 msec$^{1/2}$ of the contact of the ink according to Bristow method.

For example, plastic films such as vinyl chloride resin film, polyethylene terephthalate (PET) film, polypropylene film, polyethylene film, and polycarbonate film are suitably used as the non-permeable substrate.

Specific examples of non-permeable substrates using polypropylene and polyethylene include, but are not limited to, AR1025, AR1056, AR1082, EC1082, 1082D, 1073D, 1056D, 1025D, and FR1073 (all manufactured by DuPont-Asahi Flash Spun Products Co., Ltd.), P2002, P2102, P2108, P2161, P2171, P2111, P4266, P5767, P3162, P6181, P8121, P1162, P1111, P1128, P1181, P1153, P1157, P1146, P1147, and P1171 (all manufactured by TOYOBO CO., LTD.), YPI, Aqua-Yupo, SUPERYUPO®, ULTRAYUPO®, New YUPO®, YUPO® Electronic Appliance's Warranty, YUPO® building material paper, YUPO® High-Gloss, YUPOJET®, and Metallized YUPO (all manufactured by Yupo Corporation).

When ink is applied to a permeable substrate, the ink permeates into the substrate in addition to evaporation from the surface. On the other hand, when ink is applied to a non-permeable substrate, ink does not penetrate into the inside of the substrate. Therefore, it is required to increase volatility from the surface. Therefore, it is more preferable that the ink of the present embodiment is used for a non-permeable substrate.

Recorded Matter

The recorded matter of the present embodiment includes an image formed on a recording medium with the ink of the present embodiment. The recorded matter can be formed by an inkjet recording device executing an inkjet recording method.

The recorded matter includes, for example, a non-permeable substrate and an ink film formed on a non-permeable substrate. The non-permeable substrate has a water absorption of 10 mL/m$^2$ or less within 30 msec$^{1/2}$ of the contact with water as measured by Bristow method and the ink film contains an alcohol having a boiling point of 240 degrees C. or lower and an infrared absorbent and is free of an alcohol having a boiling point higher than 240 degrees C. Notably, "free of an alcohol having a boiling point higher than 240 degrees C." means the alcohol having a boiling point higher than 240 degrees C. is not contained or detected when the amount of the alcohol having a boiling point higher than 240 degrees C. is measured in the ink film because it is below the detection limit.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing liquids, etc. to a recording medium and a method of recording utilizing the device. The recording medium means an article to which ink or various processing fluids can be attached temporarily or permanently.

The recording device may further optionally include a device relating to feeding, conveying, and ejecting a recording medium and other devices referred to as a pre-processing device, a post-processing device, etc. in addition to the head portion to discharge the ink.

The recording device includes an infrared irradiating device (infrared irradiator) to irradiate the ink discharged onto a recording medium with infrared and the recording method includes irradiating the ink discharged onto a recording medium with infrared. Due to the infrared irradiation by the infrared irradiator to the ink applied onto a recording medium, the infrared absorbent contained in the ink absorbs infrared and generates heat, thereby drying the ink. The infrared is preferably laser beams having a wavelength of from 700 to 1000 nm. Examples of the infrared irradiator include a light emitting diode (LED), a semiconductor laser (LD), a halogen lamp, and a xenon lamp. The infrared irradiator preferably irradiates only the area of a recording medium where the ink has been applied. As a device to dry the ink, in addition to the infrared irradiator, known heating device and drying device can be used.

For example, the known heating device and the drying device can be a fan heater and an infrared heater. The ink can be heated and dried during or after printing.

In addition, when the ink is dried using the infrared irradiator, the temperature of the recording medium during the infrared irradiation is preferably 50 degrees C. or higher. The upper limit of the temperature of the recording medium during the infrared irradiation can be suitably determined and preferably 200 degrees C. or lower to diminish thermal deformation of the recording medium.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll-like form as a recording medium.

Figure 2:
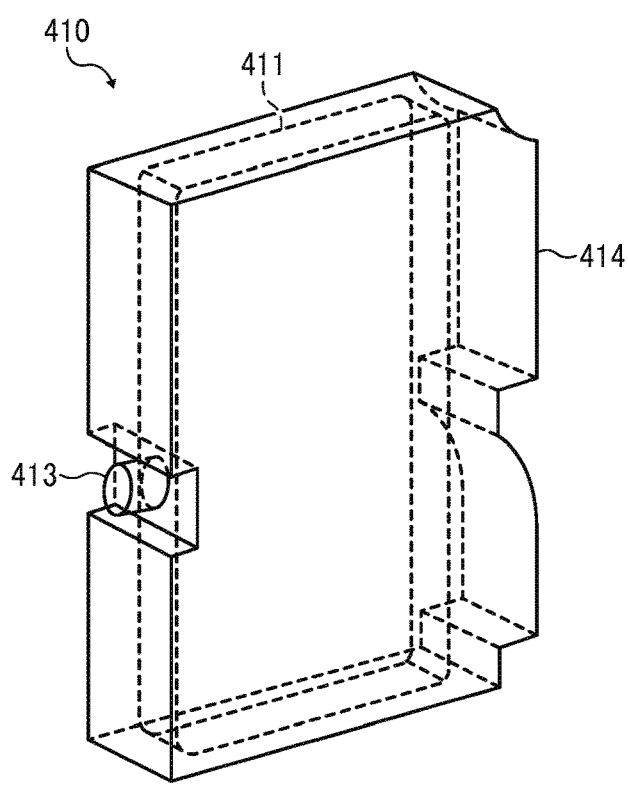
FIG. 2 is a diagram illustrating a perspective view of an example of a main tank.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit (ink container) 411 of each main tank 410 (410k, 410c, 410m, and 410y) for each color of black (K), cyan (C), magenta (M), and yellow (Y) is made of, for example, a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from a discharging head 434 to a recording medium.

This recording device may include not only a portion to discharge ink but also devices referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid or a post-processing fluid and a liquid discharging head to discharge the pre-processing fluid or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

Figure 3:
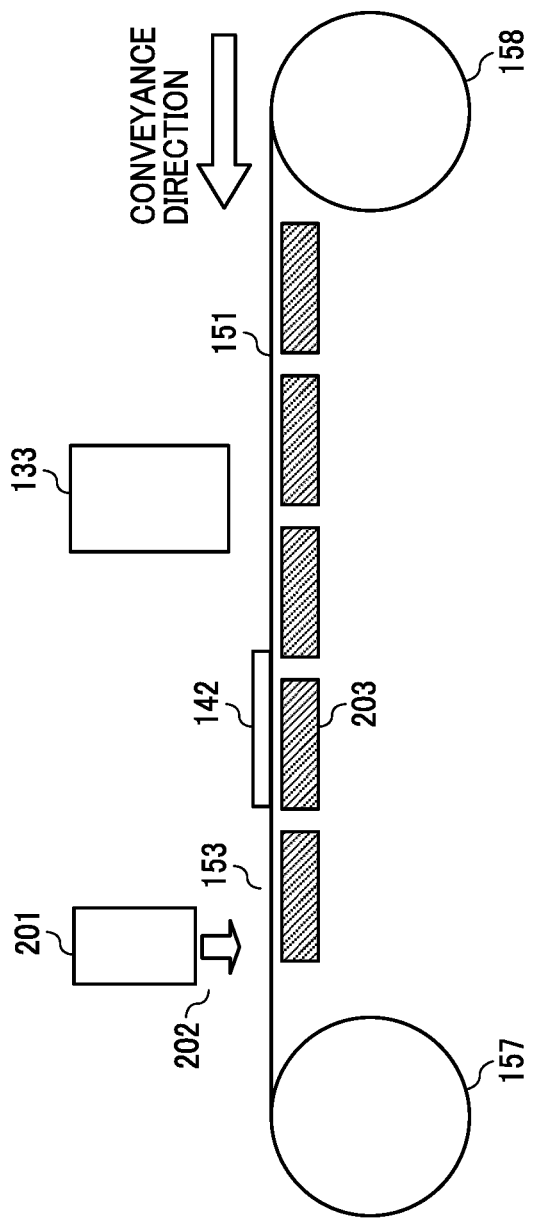
FIG. 3 is a schematic diagram illustrating an example of an infrared irradiation device.

FIG. 3 is a schematic diagram illustrating an example of the infrared irradiation device. As illustrated in FIG. 3, the recording head is driven by a carriage 133 and discharges ink droplets to a recording medium 142 according to the image signal to form an image thereon. A guiding member 153 supports the recording medium 142, which is conveyed on a conveyance belt 151 stretched between a conveyance roller 157 and a tension roller 258 in the conveyance direction. An infrared irradiation device 201 irradiates the image formed on the recording medium 142 with an infrared 202. On the opposite side of the conveyance belt 151 (the side on which the recording medium 142 is not placed), a group of heaters 203 is disposed in order to heat the recording medium 142 on which the image id formed.

The present disclosure relates to the laminate of the following 1 and also includes the following 2 to 16 as embodiments.

1. An ink contains water, an alcohol having a boiling point of 240 degrees C. or lower, and an infrared absorbent, wherein the alcohol accounts for 5.0 percent by mass or more of the total amount of the ink, wherein the ink is free of an alcohol having a boiling point higher than 240 degrees C.

2. The ink according to 1 mentioned above, the infrared absorbent has a ratio of the absorption coefficient at the maximum absorption wavelength in a range of from 380 to 700 nm to the absorption coefficient at the maximum absorption wavelength in a range of from 700 to 1000 nm of preferably 0.5 or less and more preferably 1 or less.

3. The ink according to 1 or 2 mentioned above further contains an alcohol having a boiling point of 180 degrees C. or lower.

4. The ink according to any one of 1 to 3 mentioned above further contains a polyurethane resin.

5. The ink according to 4 mentioned above, wherein the proportion of the polyurethane resin to the total amount of the ink is 5.0 percent by mass or greater.

6. The ink according to any one of 1 to 5 mentioned above, wherein the infrared absorbent contains an infrared absorbing dye having a maximum absorption wavelength of from 700 to 1000 nm.

7. The ink according to any one of 1 to 6 mentioned above further contains a silicone-based surfactant.

8. The ink according to any one of 1 to 7 mentioned above, wherein the mass proportion of the alcohol having a boiling point of 240 degrees C. or lower in the ink to the infrared absorbent in the ink is from 15.0 to 20.0.

9. The ink according to 3 mentioned above, wherein the mass ratio of the alcohol having a boiling point of 180 degrees C. or lower in the ink to the infrared absorbent in the ink is from 5.0 to 15.0.

10. A recording device includes a discharging device to discharge the ink of any one of 1 to 9 mentioned above to a recording medium and an infrared irradiation device to irradiate the ink of any one of 1 to 9 mentioned above which has been discharged onto the recording medium with infrared.

11. The recording device according to 10 mentioned above, wherein the infrared has a wavelength of from 700 to 1000 nm.

12. The recording device according to 10 or 11, wherein the infrared is a laser beam.

13. The recording device according to any one of 10 to 12 mentioned above, wherein the infrared irradiation device irradiates the area of the recording medium where the ink has been applied.

14. The recording device according to any one of 10 to 13 mentioned above, wherein the recording medium includes a non-permeable substrate having a water absorption of 10 mL/m$^2$ or less within 30 msec$^{1/2}$ of the contact with water as measured by Bristow method.

15. A recording method includes discharging the ink of any one of 1 to 9 mentioned above to a recording medium and irradiating the ink discharged onto the recording medium with infrared.

16. Recorded matter includes a non-permeable substrate and an ink film formed on the non-permeable substrate, wherein the non-permeable substrate has a water absorption of 10 mL/m$^2$ or less within 30 msec$^{1/2}$ of the contact with water as measured by Bristow method, wherein the ink film contains an alcohol having a boiling point of 240 degrees C. or lower and an infrared absorbent and is substantially free of an alcohol having a boiling point higher than 240 degrees C.

EXAMPLES

Next, the present disclosure is described in detail with reference to Examples but is not limited thereto. In Examples, parts means parts by mass and percent means percent by mass excluding those in the evaluation criteria.

Preparation Example of Cyan Pigment Liquid Dispersion

After preliminarily mixing the following recipe, the thus-obtained mixture was subjected to circulation dispersion for seven hours by a disk-type bead mill (KDL type, manufactured by SHINMARU ENTERPRISES CORPORATION; Media:

zirconia ball having a diameter of 0.3 mm) to obtain a cyan pigment liquid dispersion.

| | |
|---|---|
| Pigment Blue 15:3 (LIONOL BLUE FG-7351, manufactured by TOYO INK CO., LTD.): | 15 parts |
| Anionic surfactant (Pionine A-51-B, manufactured by TAKEMOTO OIL & FAT Co., Ltd.): | 2 parts |
| High purity water: | 83 parts |

Preparation Example of Magenta Pigment Liquid Dispersion

A magenta pigment liquid dispersion was obtained in the same manner as in the preparation example of the cyan pigment liquid dispersion except that Pigment Red 122 (Toner Magenta EO 02, manufactured by Clariant (Japan) K.K.) was used instead of Pigment Blue 15:3.

Preparation Example of Yellow Pigment Liquid Dispersion

A yellow pigment liquid dispersion was obtained in the same manner as in the preparation example of the cyan pigment liquid dispersion except that Pigment Yellow 74 (Fast Yellow 531, manufactured by Dainichiseika Color & Chemicals Mfg. Co., Ltd.) was used instead of Pigment Blue 15:3.

Preparation Example of Ink

Example 1

The following recipe was mixed and stirred, and thereafter filtered with a 5 μm filter (Minisart®, manufactured by Sartorius Stedim Biotech GmbH) to obtain Ink 1 of Example 1. When each component was added, the amount of highly pure water was adjusted so that the total amount was 100 parts.

| | |
|---|---|
| Cyan Pigment Liquid Dispersion (Solid Content Concentration: 15 percent by mass): | 20.0 parts |
| Resin particle (polyurethane resin) (Superflex 300, manufactured by Dai-ichi Kogyo Seiyaku Co., Ltd., solid concentration: 30 percent by mass): | 20.0 parts |
| Infrared absorbent: (NIR746A, maximum absorption wavelength of 746 nm, manufactured by QCR Solutions Corp.,): | 1.0 part |
| Surfactant (silicone surfactant) (BYK-348, manufactured by BYK Co., Ltd.): | 1.0 part |
| 1,2-propanediol (boiling point of 188 degrees C): | 5.0 parts |
| 3-methoxy-3-methylbutanol (boiling point of 174 degrees C): | 5.0 parts |
| Dipropylene glycol mono-methyl ether (boiling point of 190 degrees C): | 5.0 parts |
| 3-methoxy-N,N-dimethylpropionamide (boiling point of 213 degrees C) (Ekamide M100, manufactured by Idemitsu Kosan Co., Ltd.): | 10.0 parts |
| Preservatives and fungicides (PROXEL LV, manufactured by AVECIA GROUP): | 0.1 parts |
| Highly pure water: | Balance |

Examples 2 to 36 and Comparative Examples 1 to 12

The inks of Examples 2 to 36 and Comparative Examples 1 to 12 were prepared in the same manner as in Example 1 except that the combinations and the addition amounts of the respective components were changed to the combinations and the addition amounts shown in the following Tables 1 to 3. The values in Tables 1 to 3 are represented in parts by mass and highly pure water was added as a balance to make the total amount to be 100 parts by mass. Ba* in Tables 1 to 6 represents balance.

TABLE 1

| | | Boiling point | Example | | | | | |
|---|---|---|---|---|---|---|---|---|
| | | | 1 | 2 | 3 | 4 | 5 | 6 |
| Pigment liquid dispersion | Cyan pigment liquid dispersion (solid content: 15 percent) | | 20.0 | | | 20.0 | | |
| | Magenta pigment liquid dispersion (solid content: 15 percent) | | | 20.0 | | | 20.0 | |

TABLE 1-continued

|  |  |  | | | | | | |
|---|---|---|---|---|---|---|---|---|
|  | Yellow pigment liquid dispersion (solid content: 15 percent) |  |  |  | 20.0 |  |  | 20.0 |
| Resin particle | Polyurethane resin (solid content: 30 percent) |  | 20.0 | 20.0 | 20.0 | 20.0 | 20.0 | 20.0 |
|  | Acrylic-silicone resin (solid content: 50 percent) |  |  |  |  |  |  |  |
| Infrared absorbent | NIR 746A (746 nm) |  | 1.0 | 1.0 | 1.0 |  |  |  |
|  | ADS832 WS (830 nm) |  |  |  |  | 1.0 | 1.0 | 1.0 |
|  | NIR 980A (980 nm) |  |  |  |  |  |  |  |
|  | NIR 1054B (1054 nm) |  |  |  |  |  |  |  |
|  | NIR 655A (655 nm) |  |  |  |  |  |  |  |
| Surfactant | BYK-348 (Silicone-based surfactant) |  | 1.0 | 1.0 | 1.0 | 1.0 | 1.0 | 1.0 |
|  | FS 300 (Fluorochemical surfactant) |  |  |  |  |  |  |  |
| Alcohol (Boiling point not higher than 240 degrees C.) | 1,2-propane diol | 188 degrees C. | 5.0 | 5.0 | 5.0 | 5.0 | 5.0 | 5.0 |
|  | 1,3-butane diol | 207 degrees C. |  |  |  |  |  |  |
|  | 1,2-hexane diol | 223 degrees C. |  |  |  |  |  |  |
|  | 3-methoxy-3-methylbutanol | 174 degrees C. | 5.0 | 5.0 | 5.0 | 10.0 | 10.0 | 10.0 |
|  | Dipropylene glycol monomethyl ether | 190 degrees C. | 5.0 | 5.0 | 5.0 | 5.0 | 5.0 | 5.0 |
| Alcohol (Boiling point higher than 240 degrees C.) | Glycerin | 290 degrees C. |  |  |  |  |  |  |
| Other organic solvent | 3-methoxy-N,N-dimethyl propionamide | 213 degrees C. | 10.0 | 10.0 | 10.0 | 5.0 | 5.0 | 5.0 |
| Preservative | Proxel LV |  | 0.1 | 0.1 | 0.1 | 0.1 | 0.1 | 0.1 |
| Water | Highly pure water |  | Ba* | Ba* | Ba* | Ba* | Ba* | Ba* |
|  | Total amount |  | 100.0 | 100.0 | 100.0 | 100.0 | 100.0 | 100.0 |
|  | Content of alcohol having boiling point not higher than 240 degrees C. |  | 15.0 | 15.0 | 15.0 | 20.0 | 20.0 | 20.0 |

|  |  | Boiling point | Example | | | | | |
|---|---|---|---|---|---|---|---|---|
|  |  |  | 7 | 8 | 9 | 10 | 11 | 12 |
| Pigment liquid dispersion | Cyan pigment liquid dispersion (solid content: 15 percent) |  | 20.0 |  |  | 20.0 |  |  |
|  | Magenta pigment liquid dispersion (solid content: 15 percent) |  |  | 20.0 |  |  | 20.0 |  |
|  | Yellow pigment liquid dispersion (solid content: 15 percent) |  |  |  | 20.0 |  |  | 20.0 |
| Resin particle | Polyurethane resin (solid content: 30 percent) |  | 20.0 | 20.0 | 20.0 | 20.0 | 20.0 | 20.0 |
|  | Acrylic-silicone resin (solid content: 50 percent) |  |  |  |  |  |  |  |
| Infrared absorbent | NIR 746A (746 nm) |  |  |  |  |  |  |  |
|  | ADS832 WS (830 nm) |  |  |  |  | 1.0 | 1.0 | 1.0 |
|  | NIR 980A (980 nm) |  | 1.0 | 1.0 | 1.0 |  |  |  |
|  | NIR 1054B (1054 nm) |  |  |  |  |  |  |  |
|  | NIR 655A (655 nm) |  |  |  |  |  |  |  |
| Surfactant | BYK-348 (Silicone-based surfactant) |  | 1.0 | 1.0 | 1.0 | 1.0 | 1.0 | 1.0 |
|  | FS 300 (Fluorochemical surfactant) |  |  |  |  |  |  |  |
| Alcohol (Boiling point not higher than 240 degrees C.) | 1,2-propane diol | 188 degrees C. |  |  |  | 10.0 | 10.0 | 10.0 |
|  | 1,3-butane diol | 207 degrees C. |  |  |  |  |  |  |
|  | 1,2-hexane diol | 223 degrees C. |  |  |  |  |  |  |

TABLE 1-continued

|  |  | Boiling point |  |  |  |  |  |  |
|---|---|---|---|---|---|---|---|---|
| Alcohol (Boiling point higher than 240 degrees C.) | 3-methoxy-3-methylbutanol | 174 degrees C. | 15.0 | 15.0 | 15.0 |  |  |  |
|  | Dipropylene glycol monomethyl ether | 190 degrees C. | 5.0 | 5.0 | 5.0 | 5.0 | 5.0 | 5.0 |
|  | Glycerin | 290 degrees C. |  |  |  |  |  |  |
| Other organic solvent | 3-methoxy-N,N-dimethyl propionamide | 213 degrees C. | 5.0 | 5.0 | 5.0 | 8.0 | 8.0 | 8.0 |
| Preservative | Proxel LV |  | 0.1 | 0.1 | 0.1 | 0.1 | 0.1 | 0.1 |
| Water | Highly pure water |  | Ba* | Ba* | Ba* | Ba* | Ba* | Ba* |
|  | Total amount |  | 100.0 | 100.0 | 100.0 | 100.0 | 100.0 | 100.0 |
|  | Content of alcohol having boiling point not higher than 240 degrees C. |  | 20.0 | 20.0 | 20.0 | 15.0 | 15.0 | 15.0 |

|  |  | Boiling point | Example |  |  |  |  |  |
|---|---|---|---|---|---|---|---|---|
|  |  |  | 13 | 14 | 15 | 16 | 17 | 18 |
| Pigment liquid dispersion | Cyan pigment liquid dispersion (solid content: 15 percent) |  | 20.0 |  |  | 20.0 |  |  |
|  | Magenta pigment liquid dispersion (solid content: 15 percent) |  |  | 20.0 |  |  | 20.0 |  |
|  | Yellow pigment liquid dispersion (solid content: 15 percent) |  |  |  | 20.0 |  |  | 20.0 |
| Resin particle | Polyurethane resin (solid content: 30 percent) |  |  |  |  | 15.0 | 15.0 | 15.0 |
|  | Acrylic-silicone resin (solid content: 50 percent) |  | 15.0 | 15.0 | 15.0 |  |  |  |
| Infrared absorbent | NIR 746A (746 nm) |  |  |  |  |  |  |  |
|  | ADS832 WS (830 nm) |  | 1.0 | 1.0 | 1.0 | 1.0 | 1.0 | 1.0 |
|  | NIR 980A (980 nm) |  |  |  |  |  |  |  |
|  | NIR 1054B (1054 nm) |  |  |  |  |  |  |  |
|  | NIR 655A (655 nm) |  |  |  |  |  |  |  |
| Surfactant | BYK-348 (Silicone-based surfactant) |  | 1.0 | 1.0 | 1.0 | 1.0 | 1.0 | 1.0 |
|  | FS 300 (Fluorochemical surfactant) |  |  |  |  |  |  |  |
| Alcohol (Boiling point not higher than 240 degrees C.) | 1,2-propane diol | 188 degrees C. | 4.0 | 4.0 | 4.0 | 3.0 | 3.0 | 3.0 |
|  | 1,3-butane diol | 207 degrees C. |  |  |  | 3.0 | 3.0 | 3.0 |
|  | 1,2-hexane diol | 223 degrees C. |  |  |  |  |  |  |
|  | 3-methoxy-3-methylbutanol | 174 degrees C. | 5.0 | 5.0 | 5.0 | 5.0 | 5.0 | 5.0 |
|  | Dipropylene glycol monomethyl ether | 190 degrees C. | 12.0 | 12.0 | 12.0 | 5.0 | 5.0 | 5.0 |
| Alcohol (Boiling point higher than 240 degrees C.) | Glycerin | 290 degrees C. |  |  |  |  |  |  |
| Other organic solvent | 3-methoxy-N,N-dimethyl propionamide | 213 degrees C. | 10.0 | 10.0 | 10.0 | 10.0 | 10.0 | 10.0 |
| Preservative | Proxel LV |  | 0.1 | 0.1 | 0.1 | 0.1 | 0.1 | 0.1 |
| Water | Highly pure water |  | Ba* | Ba* | Ba* | Ba* | Ba* | Ba* |
|  | Total amount |  | 100.0 | 100.0 | 100.0 | 100.0 | 100.0 | 100.0 |
|  | Content of alcohol having boiling point not higher than 240 degrees C. |  | 21.0 | 21.0 | 21.0 | 16.0 | 16.0 | 16.0 |

TABLE 2

| | | Boiling point | Example 19 | 20 | 21 | 22 | 23 | 24 |
|---|---|---|---|---|---|---|---|---|
| Pigment liquid dispersion | Cyan pigment liquid dispersion (solid content: 15 percent) | | 20.0 | | | 20.0 | | |
| | Magenta pigment liquid dispersion (solid content: 15 percent) | | | 20.0 | | | 20.0 | |
| | Yellow pigment liquid dispersion (solid content: 15 percent) | | | | 20.0 | | | 20.0 |
| Resin particle | Polyurethane resin (solid content: 30 percent) | | 20.0 | 20.0 | 20.0 | 20.0 | 20.0 | 20.0 |
| | Acrylic-silicone resin (solid content: 50 percent) | | | | | | | |
| Infrared absorbent | NIR 746A (746 nm) | | | | | | | |
| | ADS832 WS (830 nm) | | | | | | | |
| | NIR 980A (980 nm) | | | | | | | |
| | NIR 1054B (1054 nm) | | 1.0 | 1.0 | 1.0 | | | |
| | NIR 655A (655 nm) | | | | | 1.0 | 1.0 | 1.0 |
| Surfactant | BYK-348 (Silicone-based surfactant) | | 1.0 | 1.0 | 1.0 | 1.0 | 1.0 | 1.0 |
| | FS 300 (Fluorochemical surfactant) | | | | | | | |
| Alcohol (Boiling point not higher than 240 degrees C.) | 1,2-propane diol | 188 degrees C. | 3.0 | 3.0 | 3.0 | 3.0 | 3.0 | 3.0 |
| | 1,3-butane diol | 207 degrees C. | 3.0 | 3.0 | 3.0 | 3.0 | 3.0 | 3.0 |
| | 1,2-hexane diol | 223 degrees C. | | | | | | |
| | 3-methoxy-3-methylbutanol | 174 degrees C. | 5.0 | 5.0 | 5.0 | 5.0 | 5.0 | 5.0 |
| | Dipropylene glycol monomethyl ether | 190 degrees C. | 5.0 | 5.0 | 5.0 | 5.0 | 5.0 | 5.0 |
| Alcohol (Boiling point higher than 240 degrees C.) | Glycerin | 290 degrees C. | | | | | | |
| Other organic solvent | 3-methoxy-N,N-dimethyl propionamide | 213 degrees C. | 10.0 | 10.0 | 10.0 | 10.0 | 10.0 | 10.0 |
| Preservative | Proxel LV | | 0.1 | 0.1 | 0.1 | 0.1 | 0.1 | 0.1 |
| Water | Highly pure water | | Ba* | Ba* | Ba* | Ba* | Ba* | Ba* |
| | Total amount | | 100.0 | 100.0 | 100.0 | 100.0 | 100.0 | 100.0 |
| | Content of alcohol having boiling point not higher than 240 degrees C. | | 210 | 16.0 | 16.0 | 16.0 | 16.0 | 16.0 |

| | | Boiling point | Example 25 | 26 | 27 | 28 | 29 | 30 |
|---|---|---|---|---|---|---|---|---|
| Pigment liquid dispersion | Cyan pigment liquid dispersion (solid content: 15 percent) | | 20.0 | | | 20.0 | | |
| | Magenta pigment liquid dispersion (solid content: 15 percent) | | | 20.0 | | | 20.0 | |
| | Yellow pigment liquid dispersion (solid content: 15 percent) | | | | 20.0 | | | 20.0 |
| Resin particle | Polyurethane resin (solid content: 30 percent) | | 20.0 | 20.0 | 20.0 | 20.0 | 20.0 | 20.0 |
| | Acrylic-silicone resin (solid content: 50 percent) | | | | | | | |
| Infrared absorbent | NIR 746A (746 nm) | | | | | 1.0 | 1.0 | 1.0 |
| | ADS832 WS (830 nm) | | 1.0 | 1.0 | 1.0 | | | |
| | NIR 980A (980 nm) | | | | | | | |
| | NIR 1054B (1054 nm) | | | | | | | |
| | NIR 655A (655 nm) | | | | | | | |

TABLE 2-continued

| | | | | | | | | |
|---|---|---|---|---|---|---|---|---|
| Surfactant | BYK-348 (Silicone-based surfactant) | | | | | 1.0 | 1.0 | 1.0 |
| | FS 300 (Fluorochemical surfactant) | | 1.0 | 1.0 | 1.0 | | | |
| Alcohol (Boiling point not higher than 240 degrees C.) | 1,2-propane diol | 188 degrees C. | 3.0 | 3.0 | 3.0 | 2.0 | 2.0 | 2.0 |
| | 1,3-butane diol | 207 degrees C. | 3.0 | 3.0 | 3.0 | | | |
| | 1,2-hexane diol | 223 degrees C. | | | | | | |
| | 3-methoxy-3-methylbutanol | 174 degrees C. | 5.0 | 5.0 | 5.0 | 2.0 | 2.0 | 2.0 |
| | Dipropylene glycol monomethyl ether | 190 degrees C. | 5.0 | 5.0 | 5.0 | 2.0 | 2.0 | 2.0 |
| Alcohol (Boiling point higher than 240 degrees C.) | Glycerin | 290 degrees C. | | | | | | |
| Other organic solvent | 3-methoxy-N,N-dimethyl propionamide | 213 degrees C. | 10.0 | 10.0 | 10.0 | 10.0 | 10.0 | 10.0 |
| Preservative | Proxel LV | | 0.1 | 0.1 | 0.1 | 0.1 | 0.1 | 0.1 |
| Water | Highly pure water | | Ba* | Ba* | Ba* | Ba* | Ba* | Ba* |
| | Total amount | | 100.0 | 100.0 | 100.0 | 100.0 | 100.0 | 100.0 |
| | Content of alcohol having boiling point not higher than 240 degrees C. | | 21.0 | 16.0 | 16.0 | 16.0 | 16.0 | 6.0 |

| | | Boiling point | Example | | | | | |
|---|---|---|---|---|---|---|---|---|
| | | | 31 | 32 | 33 | 34 | 35 | 36 |
| Pigment liquid dispersion | Cyan pigment liquid dispersion (solid content: 15 percent) | | 20.0 | | | 20.0 | | |
| | Magenta pigment liquid dispersion (solid content: 15 percent) | | | 20.0 | | | 20.0 | |
| | Yellow pigment liquid dispersion (solid content: 15 percent) | | | | 20.0 | | | 20.0 |
| Resin particle | Polyurethane resin (solid content: 30 percent) | | 20.0 | 20.0 | 20.0 | 20.0 | 20.0 | 20.0 |
| | Acrylic-silicone resin (solid content: 50 percent) | | | | | | | |
| Infrared absorbent | NIR 746A (746 nm) | | 0.8 | 0.8 | 0.8 | 1.5 | 1.5 | 1.5 |
| | ADS832 WS (830 nm) | | | | | | | |
| | NIR 980A (980 nm) | | | | | | | |
| | NIR 1054B (1054 nm) | | | | | | | |
| | NIR 655A (655 nm) | | | | | | | |
| Surfactant | BYK-348 (Silicone-based surfactant) | | 1.0 | 1.0 | 1.0 | 1.0 | 1.0 | 1.0 |
| | FS 300 (Fluorochemical surfactant) | | | | | | | |
| Alcohol (Boiling point not higher than 240 degrees C.) | 1,2-propane diol | 188 degrees C. | 4.0 | 4.0 | 4.0 | 8.0 | 8.0 | 8.0 |
| | 1,3-butane diol | 207 degrees C. | | | | | | |
| | 1,2-hexane diol | 223 degrees C. | | | | | | |
| | 3-methoxy-3-methylbutanol | 174 degrees C. | 4.0 | 4.0 | 4.0 | 7.0 | 7.0 | 7.0 |
| | Dipropylene glycol monomethyl ether | 190 degrees C. | 6.0 | 6.0 | 6.0 | 5.0 | 5.0 | 5.0 |
| Alcohol (Boiling point higher than 240 degrees C.) | Glycerin | 290 degrees C. | | | | | | |
| Other organic solvent | 3-methoxy-N,N-dimethyl propionamide | 213 degrees C. | 10.0 | 10.0 | 10.0 | 5.0 | 5.0 | 5.0 |

TABLE 2-continued

| Preservative | Proxel LV | | 0.1 | 0.1 | 0.1 | 0.1 | 0.1 | 0.1 |
|---|---|---|---|---|---|---|---|---|
| Water | Highly pure water | | Ba* | Ba* | Ba* | Ba* | Ba* | Ba* |
| | Total amount | | 100.0 | 100.0 | 100.0 | 100.0 | 100.0 | 100.0 |
| | Content of alcohol having boiling point not higher than 240 degrees C. | | 21.0 | 14.0 | 14.0 | 14.0 | 14.0 | 20.0 |

TABLE 3

| | | Boiling point | Comparative Example | | | | | |
|---|---|---|---|---|---|---|---|---|
| | | | 1 | 2 | 3 | 4 | 5 | 6 |
| Pigment liquid dispersion | Cyan pigment liquid dispersion (solid content: 15 percent) | | 20.0 | | | 20.0 | | |
| | Magenta pigment liquid dispersion (solid content: 15 percent) | | | 20.0 | | | 20.0 | |
| | Yellow pigment liquid dispersion (solid content: 15 percent) | | | | 20.0 | | | 20.0 |
| Resin particle | Polyurethane resin (solid content: 30 percent) | | 20.0 | 20.0 | 20.0 | 20.0 | 20.0 | 20.0 |
| | Acrylic-Silicone resin (solid content: 50 percent) | | | | | | | |
| Infrared absorbent | NIR 746A (746 nm) | | | | | 1.0 | 1.0 | 1.0 |
| | ADS 832WS (830 nm) | | | | | | | |
| | NIR 980A (980 nm) | | | | | | | |
| | NIR 1054B (1054 nm) | | 1.0 | 1.0 | 1.0 | | | |
| | NIR 655A (655 nm) | | | | | | | |
| Surfactant | BYK-348 (Silicone-based surfactant) | | 1.0 | 1.0 | 1.0 | 1.0 | 1.0 | 1.0 |
| | FS 300 (Fluorochemical surfactant) | | | | | | | |
| Alcohol (Boiling point not higher than 240 degrees C.) | 1,2-propane diol | 188 degrees C. | 3.0 | 3.0 | 3.0 | 5.0 | 5.0 | 5.0 |
| | 1,3-butane diol | 207 degrees C. | 3.0 | 3.0 | 3.0 | | | |
| | 1,2-hexane diol | 223 degrees C. | | | | | | |
| | 3-methoxy-3-methylbutanol | 174 degrees C. | 5.0 | 5.0 | 5.0 | 5.0 | 5.0 | 5.0 |
| | Dipropylene glycol monomethyl ether | 190 degrees C. | | | | 5.0 | 5.0 | 5.0 |
| Alcohol (Boiling point higher than 240 degrees C.) | Glycerin | 290 degrees C. | 5.0 | 5.0 | 5.0 | 5.0 | 5.0 | 5.0 |
| Other organic solvent | 3-methoxy-N,N-dimethyl propionamide | 213 degrees C. | 10.0 | 10.0 | 10.0 | 10.0 | 10.0 | 10.0 |
| Preservative | Proxel LV | | 0.1 | 0.1 | 0.1 | 0.1 | 0.1 | 0.1 |
| Water | Highly pure water | | Ba* | Ba* | Ba* | Ba* | Ba* | Ba* |
| | Total amount | | 100.0 | 100.0 | 100.0 | 100.0 | 100.0 | 100.0 |
| | Content of alcohol having boiling point not higher than 240 degrees C. | | 11.0 | 11.0 | 11.0 | 15.0 | 15.0 | 15.0 |

| | | Boiling point | Comparative Example | | | | | |
|---|---|---|---|---|---|---|---|---|
| | | | 7 | 8 | 9 | 10 | 11 | 12 |
| Pigment liquid dispersion | Cyan pigment liquid dispersion (solid content: 15 percent) | | 20.0 | | | 20.0 | | |
| | Magenta pigment liquid dispersion (solid content: 15 percent) | | | 20.0 | | | 20.0 | |

TABLE 3-continued

| | | | | | | | | |
|---|---|---|---|---|---|---|---|---|
| | Yellow pigment liquid dispersion (solid content: 15 percent) | | | | 20.0 | | | 20.0 |
| Resin particle | Polyurethane resin (solid content: 30 percent) | | 20.0 | 20.0 | 20.0 | 20.0 | 20.0 | 20.0 |
| | Acrylic-Silicone resin (solid content: 50 percent) | | | | | | | |
| Infrared absorbent | NIR 746A (746 nm) | | 1.0 | 1.0 | 1.0 | | | |
| | ADS 832WS (830 nm) | | | | | | | |
| | NW 980A (980 nm) | | | | | | | |
| | NIR 1054B (1054 nm) | | | | | | | |
| | NIR 655A (655 nm) | | | | | | | |
| Surfactant | BYK-348 (Silicone-based surfactant) | | 1.0 | 1.0 | 1.0 | 1.0 | 1.0 | 1.0 |
| | FS 300 (Fluorochemical surfactant) | | | | | | | |
| Alcohol (Boiling point not higher than 240 degrees C.) | 1,2-propane diol | 188 degrees C. | 1.0 | 1.0 | 1.0 | 5.0 | 5.0 | 5.0 |
| | 1,3-butane diol | 207 degrees C. | | | | | | |
| | 1,2-hexane diol | 223 degrees C. | | | | | | |
| | 3-methoxy-3-methylbutanol | 174 degrees C. | 1.0 | 1.0 | 1.0 | 5.0 | 5.0 | 5.0 |
| | Dipropylene glycol monomethyl ether | 190 degrees C. | 1.0 | 1.0 | 1.0 | 5.0 | 5.0 | 5.0 |
| Alcohol (Boiling point higher than 240 degrees C.) | Glycerin | 290 degrees C. | | | | | | |
| Other organic solvent | 3-methoxy-N,N-dimethyl propionamide | 213 degrees C. | 10.0 | 10.0 | 10.0 | 10.0 | 10.0 | 10.0 |
| Preservative | Proxel LV | | 0.1 | 0.1 | 0.1 | 0.1 | 0.1 | 0.1 |
| Water | Highly pure water | | Ba* | Ba* | Ba* | Ba* | Ba* | Ba* |
| | Total amount | | 100.0 | 100.0 | 100.0 | 100.0 | 100.0 | 100.0 |
| | Content of alcohol having boiling point not higher than 240 degrees C. | | 3.0 | 3.0 | 3.0 | 15.0 | 15.0 | 15.0 |

In Tables 1 to 3, the product names and the manufacturing companies of the ingredients are as follows:

Resin particle (acrylic-silicone resin, AE 980, manufactured by EMULSION TECHNOLOGY CO., LTD., solid concentration of 50 percent by mass)

Infrared absorbent (ADS 832WS, manufactured by American Dye Source, Inc., maximum absorption wavelength of 830 nm)

Infrared absorbent (NIR980A, maximum absorption wavelength of 980 nm, manufactured by QCR Solutions Corp.)

Infrared absorbent (NIR1054A, maximum absorption wavelength of 1054 nm, manufactured by QCR Solutions Corp.)

Infrared absorbent (VIS655A, maximum absorption wavelength of 655 nm, manufactured by QCR Solutions Corp.)

Surfactant (Fluorochemical surfactant, FS300, manufactured by E. I. du Pont de Nemours and Company)

The inks obtained in Examples 1 to 36 and Comparative Examples 1 to 12 were evaluated on drying property, discharging stability, abrasion resistance, beading, and image gloss according to the following methods and evaluation criteria. These results are shown in Table 4.

Evaluation on Drying Property

Using a remodeled inkjet printer (IPSiO GX5000, manufactured by Ricoh Co., Ltd.) filled with ink in which a near infrared irradiation unit and a heated-wind drying unit of 70 degrees C. were disposed immediately downstream of the ink discharging process, a solid image was formed on a polyvinyl chloride film, also referred to as PVC film, (CPPVWP 1300, manufactured by SAKURAI CO., LTD.) with a resolution of 600 dpi. Immediately after the image formation, the printed matter was allowed to pass through the near infrared irradiation unit at a speed of 2 m/min and further through the heated-wind drying unit described above.

Thereafter, filter paper was pressed against the solid image formed on the PVC film. The degree of transfer onto the filter paper was visually observed to evaluate the ink on drying property according to the following criteria. B and above in the following evaluation criteria were determined as practically usable.

Evaluation Criteria

A: Transfer of pigment to filter paper little observed
B: Transfer of pigment to filter paper slightly observed
C: Transfer of pigment to filter paper apparently observed Evaluation on Discharging Stability The ink was continuously discharged for 45 minutes using an inkjet printer (IPSiO GX e3300, manufactured by Ricoh Co., Ltd.) and thereafter the surface of the recording head was dried for 30 minutes after the cease of discharging. Thereafter, 3 mL of a rinsing solution was applied to the nozzle surface of the recording head using a dropper. Subsequently, the nozzle surface was wiped off, and the ink was discharged again to evaluate the ink on discharging stability according to the following evaluation criteria. B and above in the following evaluation criteria were determined as practically usable.

Evaluation Criteria
A: Discharging disturbance and non-discharging not occurred at all
B: Discharging disturbance and non-discharging occurred at 5 or less nozzles
C: Discharging disturbance and non-discharging occurred at more than 5 nozzles Evaluation on Abrasion Resistance
First, printed matter was prepared in the same manner as for the evaluation of drying property.
Thereafter, the solid image formed on the PVC film was abraded by a cotton cloth times. The degree of transfer onto the cotton cloth was visually observed to evaluate the ink on abrasion resistance according to the following criteria. B and above in the following evaluation criteria were determined as practically preferable.
Evaluation Criteria
A: Transfer of pigment to cotton cloth little observed
B: Transfer of pigment to cotton cloth slightly observed
C: Transfer of pigment to cotton cloth apparently observed Evaluation on Beading
First, printed matter was prepared in the same manner as for the evaluation of drying property.
Uneven image density (beading) of the solid image formed on the PVC film was visually observed to evaluate the ink on beading according to the following evaluation criteria. B and above in the following evaluation criteria were determined as practically preferable.
Evaluation Criteria
A: Excellent (No beading observed)
B: Good (Beading slightly observed)
C: Fair (Beading observed)
D: Poor (Beading significantly observed)

Evaluation on Degree of Image Gloss
First, printed matter was prepared in the same manner as for the evaluation of drying property.
Gloss at 60 degrees of the solid image formed on the PVC was measured by a gloss meter (4501, manufactured by BYK Gardener GmbH) four times to obtain the average of the gloss values to evaluate the ink on image gloss according to the following criteria. B and above in the following evaluation criteria were determined as practically preferable.
Evaluation Criteria
AA: Gloss value is 100 or greater
A: Gloss value is 90 to less than 100
B: Gloss value is 80 to less than 90
C: Gloss value is less than 80

TABLE 4

|  |  | Drying Property | Discharging stability | Scratch resistance | Beading property | Image gloss |
|---|---|---|---|---|---|---|
| Example | 1 | A | A | A | A | AA |
|  | 2 | A | A | A | A | AA |
|  | 3 | A | A | A | A | AA |
|  | 4 | A | A | A | A | AA |
|  | 5 | A | A | A | A | AA |
|  | 6 | A | A | A | A | AA |
|  | 7 | A | A | A | A | AA |
|  | 8 | A | A | A | A | AA |
|  | 9 | A | A | A | A | AA |
|  | 10 | B | A | A | B | AA |
|  | 11 | B | A | A | B | AA |
|  | 12 | B | A | A | B | AA |
|  | 13 | A | A | B | B | AA |
|  | 14 | A | A | B | B | AA |
|  | 15 | A | A | B | B | AA |
|  | 16 | A | A | B | B | AA |
|  | 17 | A | A | B | B | AA |
|  | 18 | A | A | B | B | AA |
|  | 19 | B | A | A | A | AA |
|  | 20 | B | A | A | A | AA |
|  | 21 | B | A | A | A | AA |
|  | 22 | B | A | A | A | AA |
|  | 23 | B | A | A | A | AA |
|  | 24 | B | A | A | A | AA |
|  | 25 | A | B | A | A | A |
|  | 26 | A | B | A | A | A |
|  | 27 | A | B | A | A | A |
|  | 28 | B | A | A | B | AA |
|  | 29 | B | A | A | B | AA |
|  | 30 | B | A | A | B | AA |
|  | 31 | A | A | A | A | AA |
|  | 32 | A | A | A | A | AA |
|  | 33 | A | A | A | A | AA |
|  | 34 | A | A | A | A | AA |
|  | 35 | A | A | A | A | AA |
|  | 36 | A | A | A | A | AA |
| Comparative Example | 1 | C | C | B | B | A |
|  | 2 | C | C | B | B | A |
|  | 3 | C | C | B | B | A |
|  | 4 | C | B | B | C | A |
|  | 5 | C | B | B | C | A |
|  | 6 | C | B | B | C | A |
|  | 7 | C | B | B | B | C |
|  | 8 | C | B | B | B | C |
|  | 9 | C | B | B | B | C |
|  | 10 | C | B | B | C | A |
|  | 11 | C | B | B | C | A |
|  | 12 | C | B | B | C | A |

Examples 1 to 9 are preferable embodiments and demonstrated excellent drying property and discharging stability. Also, the obtained printed images had excellent abrasion resistance and beading in addition to a high level of image gloss even on non-permeable recording media.

Examples 10 to 12, in which a large amount of alcohol having a boiling point of 180 degrees C. or higher was used, were inferior to Examples 1 to 9 with regard to drying properties and beading properties.

Examples 13 to 15, in which a polyurethane resin was not used, were inferior to Examples 1 to 9 with regard to abrasion resistance and beading properties.

Examples 16 to 18, in which a slightly less amount of polyurethane resin was used, were inferior to Examples 1 to 9 with regard to abrasion resistance and beading properties.

Examples 19 to 24, in which the maximum absorption wavelength of the infrared absorbent was slightly shorter or longer, were inferior to Examples 1 to 9 with regard to drying properties.

Examples 25 to 27, in which a silicone-based surfactant was not used, were inferior to Examples 1 to 9 with regard to discharging stability and image gloss.

Examples 28 to 30, in which a small amount of alcohol having a boiling point of 240 degrees C. or lower was used, were inferior to Examples 1 to 9 with regard to drying properties and beading properties.

In Examples 31 to 33, the infrared absorbent was changed to 0.8 parts, and in Examples 34 to 36, the infrared absorbent was changed to 1.5 parts. Good evaluation results are obtained in all the cases, as in Examples 1 to 9.

Comparative Examples 1 to 6, in which the inks contained an alcohol having a boiling point higher than 240 degrees C., were inferior to Examples with regard to drying properties, discharging stability, and beading properties.

Comparative Examples 7 to 9, in which a small amount of alcohol having a boiling point of 240 degrees C. or lower was used, were inferior to Examples with regard to drying properties and image gloss.

Comparative Examples 10 to 12, in which the inks did not contain an infrared absorbent, were inferior to Examples with regard to drying properties and beading properties.

As seen in the results shown in Table 4, the ink set containing each color ink of cyan, magenta, and yellow also demonstrated excellent drying properties, discharging stability, abrasion resistance, beading properties, and image gloss.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink, comprising:
water;
a first alcohol having a boiling point of 240 degrees C. or lower; and
an infrared absorbent,
wherein the first alcohol accounts for 5.0 percent by mass or more of a total amount of the ink,
the ink is free of a second alcohol having a boiling point higher than 240 degrees C.,
said infrared absorbent of said ink may be precipitated, and
a mass ratio of the first alcohol to the infrared absorbent is from 15.0 to 20.0.

2. The ink of claim 1, wherein the infrared absorbent has a ratio of 0.5 or less, the ratio being an absorption coefficient at a maximum absorption wavelength in a range of from 380 to 700 nm to an absorption coefficient at a maximum absorption wavelength in a range of from 700 to 1000 nm.

3. The ink of claim 1, wherein the first alcohol has a boiling point of 180 degrees C. or lower.

4. The ink of claim 1, further comprising a polyurethane resin.

5. The ink of claim 4, wherein a proportion of the polyurethane resin to a total amount of the ink is 5.0 percent by mass or greater.

6. The ink of claim 1, wherein the infrared absorbent comprises an infrared absorbing dye having a maximum absorption wavelength of from 700 to 1000 nm.

7. The ink of claim 1, further comprising a silicone-based surfactant.

8. An ink, comprising:
water;
a first alcohol having a boiling point of 180 degrees C. or lower; and
an infrared absorbent,
wherein the first alcohol accounts for 5.0 percent by mass or more of a total amount of the ink,
the ink is free of a second alcohol having a boiling point higher than 240 degrees C.,
said infrared absorbent of said ink may be precipitated, and
a mass ratio of the first alcohol to the infrared absorbent is from 5.0 to 15.0.

9. A recording method, comprising:
discharging the ink of claim 1 to a recording medium; and
irradiating the discharged ink with infrared irradiation.

10. Recorded matter, comprising:
a non-permeable substrate; and
an ink film formed on the non-permeable substrate from the ink of claim 1,
wherein the non-permeable substrate has a water absorption of 10 mL/m$^2$ or less within 30 msec$^{1/2}$ of a contact with water as measured by the Bristow method, and
the ink film comprises an alcohol having a boiling point of 240 degrees C. or lower and an infrared absorbent, and is free of an alcohol having a boiling point higher than 240 degrees C.

* * * * *